(12) United States Patent
Zhang et al.

(10) Patent No.: US 11,201,020 B2
(45) Date of Patent: Dec. 14, 2021

(54) BRACKET, FUNCTIONAL MODULE, MOUNTING METHOD OF ELECTRICAL DEVICE AND THE ELECTRICAL DEVICE

(71) Applicant: SCHNEIDER ELECTRIC (AUSTRALIA) PTY LTD., Macquarie Park (AU)

(72) Inventors: Dahai Zhang, Shenzhen (CN); Zhen Ma, Shenzhen (CN); Pei Shang, Shenzhen (CN)

(73) Assignee: SCHNEIDER ELECTRIC (AUSTRALIA) PTY LTD, Macquarie Park (AU)

( * ) Notice: Subject to any disclaimer, the term of this patent is extended or adjusted under 35 U.S.C. 154(b) by 235 days.

(21) Appl. No.: 16/266,820

(22) Filed: Feb. 4, 2019

(65) Prior Publication Data

US 2020/0211790 A1 Jul. 2, 2020

(30) Foreign Application Priority Data

Dec. 29, 2018 (CN) .......................... 201811629455.4

(51) Int. Cl.
*H01H 9/02* (2006.01)
*H01R 13/633* (2006.01)
*H02G 3/14* (2006.01)
*H01R 13/70* (2006.01)
*H01R 13/46* (2006.01)

(52) U.S. Cl.
CPC ............... *H01H 9/02* (2013.01); *H01R 13/46* (2013.01); *H01R 13/6335* (2013.01); *H01R 13/70* (2013.01); *H02G 3/14* (2013.01)

(58) Field of Classification Search
CPC ........ H01H 9/02; H01H 9/0207; H01R 13/46; H01R 13/6335; H01R 13/70; H01R 13/447; H01R 13/52; H02G 3/12; H02G 3/14; H02G 13/121; H02G 3/123
USPC ........... 174/480, 481, 50, 53, 57, 58, 66, 67; 220/241, 242, 3.2, 3.8; 439/535, 536
See application file for complete search history.

(56) References Cited

U.S. PATENT DOCUMENTS 5,073,681 A * 12/1991 Hubben ................... H02G 3/14
174/66
5,723,817 A * 3/1998 Arenas ..................... H02G 3/14
174/66
6,657,144 B2 * 12/2003 Savicki, Jr. ............. H01H 23/04
174/53

(Continued)

*Primary Examiner* — Angel R Estrada
(74) *Attorney, Agent, or Firm* — Locke Lord LLP

(57) ABSTRACT

Embodiments of the present disclosure provide a bracket, a functional module and a mounting method of an electrical device. The bracket described herein includes a body comprising a supporting portion adapted to support a functional component of the electrical device, a first coupling portion and a second coupling portion symmetrically arranged on the body with respect to a longitudinal axis of the supporting portion, and the second coupling portion is adapted to be coupled with the first coupling portion of a further bracket of the same specification to form a bracket set. The bracket described herein can be interlocked together, and the mounting component and the bracket are integrally formed. As a result, the appearance of the electrical device is improved, more mounting screws are saved, the mounting steps of the electrical device are reduced, and the mounting efficiency of the electrical device is improved.

17 Claims, 10 Drawing Sheets

(56) References Cited

U.S. PATENT DOCUMENTS

| | | | | |
|---|---|---|---|---|
| 7,211,727 B2* | 5/2007 | Pearse | .................. | H01R 13/745 |
| | | | | 174/481 |
| 7,230,183 B2* | 6/2007 | Oddsen | ................ | H01R 13/648 |
| | | | | 174/66 |
| 7,960,651 B2* | 6/2011 | Alderson | ................. | H02G 3/14 |
| | | | | 174/66 |
| 8,067,690 B2* | 11/2011 | Anders | .................. | H01H 23/04 |
| | | | | 174/50 |
| 8,420,956 B2* | 4/2013 | Alderson | ................. | H02G 3/12 |
| | | | | 174/480 |
| 8,658,893 B1* | 2/2014 | Shotey | ............... | H01H 11/0006 |
| | | | | 174/58 |
| 8,835,764 B2* | 9/2014 | Seff | ...................... | H02G 3/0493 |
| | | | | 174/67 |
| 10,141,144 B2* | 11/2018 | Zhuang | ................. | H02K 11/33 |
| 10,541,093 B2* | 1/2020 | Zhang | .................... | H01H 9/168 |

* cited by examiner

BRACKET, FUNCTIONAL MODULE, MOUNTING METHOD OF ELECTRICAL DEVICE AND THE ELECTRICAL DEVICE

FIELD

Embodiments of the present disclosure generally relate to an electrical device, and more specifically, to a bracket, a functional module and mounting method of an electrical device.

BACKGROUND

Electrical devices are widely used in industrial and domestic applications, and the fields of application are well known. Electrical devices include wall switches, wall outlets, and the like. Usually, the wall switch or wall socket can be mounted in the wall following the steps of installing the function module into the pre-arranged wall box in the wall with a screw and then fixing the cover to the function module of the wall switch or wall socket with another screw. The known electrical device is installed with a plurality of screws. On one hand, the installation of the known electrical device requires multiple installation steps, resulting in a low installing efficiency. On the other hand, the screws are exposed on the outer surface of the electrical device, resulting in a poor appearance.

Furthermore, when the wall switch is arranged in parallel, the combination of multiple functional modules is inconvenient and the size of each functional module is limited.

SUMMARY

The known electrical devices, such as wall switches or wall sockets, have various problems such as poor appearance, lower installing efficiency, or the like.

In order to at least partially solve the above problems and other potential problems, embodiments of the present disclosure provide a bracket, a functional module and mounting method of an electrical device.

In a first aspect, embodiments of the present disclosure provide a bracket. The bracket comprises a body comprising a supporting portion adapted to support a functional component of the electrical device; a first coupling portion and a second coupling portion symmetrically arranged on the body with respect to a longitudinal central axis of the supporting portion, and the second coupling portion is adapted to be coupled with the first coupling portion of a further bracket of the same specification to form a bracket set.

In some embodiments, one of the first coupling portion and the second coupling portion comprises a convex and the other comprises a concave coupled to the convex.

In a second aspect, embodiments of the present disclosure provide a functional module. The functional module comprises a bracket according to any one of the preceding embodiments; and a functional component coupled to and supported by the bracket.

In some embodiments, the bracket comprises a grounding member electrically connected to the functional component to provide grounding for the functional component.

In some embodiments, the grounding member is integrally formed with the body portion of the bracket.

In some embodiments, the bracket comprises a buckle and the functional component comprises a buckle groove coupled with the buckle.

In a third aspect, embodiments of the present disclosure provide an electrical device. The electrical device comprises the functional module according to any one of the preceding embodiments, adapted to be mounted in a mounting recess; and an operational assembly coupled with the functional module for the operation of the functional module.

In some embodiments, the operational assembly is detachably snap-coupled with the functional module.

In some embodiments, the functional module comprises a snap slot 8 and the operational assembly comprises an operable button coupled with the snap slot 8, which operable button is adapted to be pressed to decouple the operational assembly from the functional module.

In some embodiments, the operational assembly comprises a mounting component arranged on and coupled to the functional module; and an operating component arranged on and rotatably coupled to the mounting component such that the operating component is capable of operating the functional module.

In some embodiments, the mounting component is arranged on and coupled with the bracket of the functional module.

In some embodiments, the mounting component comprises a mounting frame and the operating component comprises an operable panel.

In some embodiments, one of the mounting component and the operating component comprises a rotating shaft, and the other of the mounting component and the operating component comprises a shaft hole coupled with the rotating shaft.

In some embodiments, the functional module comprises a switching component for switching the state of the electrical device, and the operating component comprises a driving portion coupled with the switching component for driving the switching component to switch the state of the electrical device.

In some embodiments, the switching component comprises a swing lever for switching the state of the electrical device by rotation; and the driving portion comprises a pressing block for pressing a surface of the swing lever by rotation of the operating component to drive the swing lever to rotate.

In some embodiments, the electrical device comprises a plurality of the functional modules which form a functional module set by means of coupling adjacent brackets.

In some embodiments, the operational assembly comprises a multi-mounting component arranged on and coupled with the functional module set; and a plurality of operating components arranged on and rotatably coupled to the multi-mounting component such that each of the operating components is capable of operating one of the functional modules of the functional module set respectively.

In some embodiments, the electrical device is a switch device or a socket device.

In a fourth aspect, embodiments of the present disclosure provide a method for mounting an electrical device. The electrical device comprises a functional module, a mounting component and an operating component, the method comprises mounting the functional module into the mounting recess; combining the mounting component and the operating component to constitute an operational assembly; and snapping the operational assembly onto the functional module.

In some embodiments, the functional module is coupled with further functional modules of the same specification to form a functional module set before the functional module is mounted into the mounting recess.

Further features of the present disclosure will become apparent from the following description of exemplary embodiments. It is to be understood that the invention is not intended to be limited to the scope of the present disclosure. Other features of the present disclosure will be readily understood by the following description.

BRIEF DESCRIPTION OF THE DRAWINGS

The above and other objects, features, and advantages of the present disclosure will become more apparent from the aspects of the embodiments of the invention. The reference numbers generally indicate the same components.

The same or similar elements are denoted by the same or similar reference numbers throughout the drawings.

DETAILED DESCRIPTION

The present disclosure will now be described with reference to a few exemplary embodiments. It is to be understood that the embodiments are merely described to enable those skilled in the art to understand the invention, and the embodiments are not intended to limit the scope of the invention.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Figure 1:
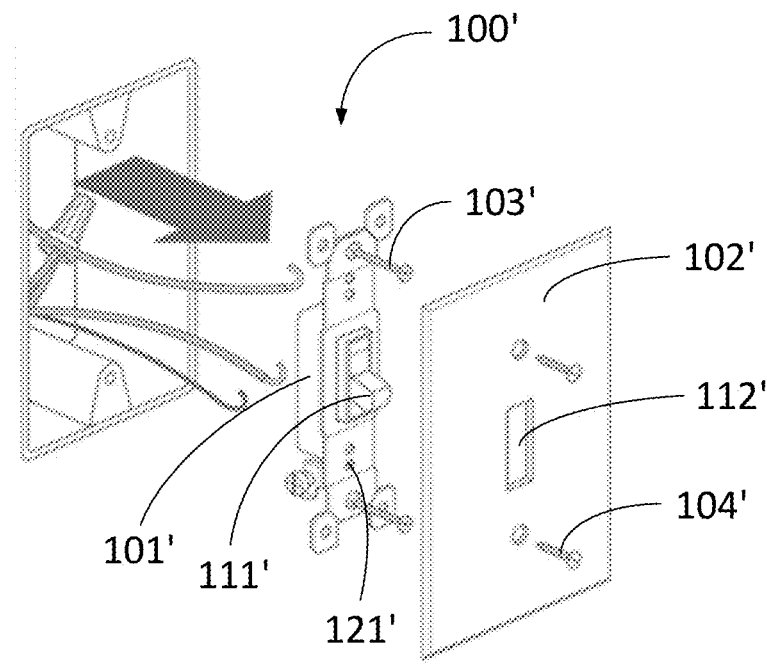
FIG. 1 shows an exploded view of a known electrical device.

FIG. 1 shows an exploded view of a known electrical device 100'. As shown in FIG. 1, a known electrical device 100' comprises a functional module 101' and a cover 102'. The functional module 101' is mounted in the mounting box via mounting screws 103'. The cover 102' is mounted onto the functional module 101' by coupling fixing screws 104' to connecting holes 121' provided on the functional module 101'. The operating component 111' of the functional module 101' passes through the through hole 112' of the cover 102'. It can be seen that the mounting process of such an electrical device 100' requires two screwing installations and a total of four screws to be installed, resulting in a low installing efficiency. Furthermore, the fixing screws 104' are exposed on the outer surface of the cover 102', resulting in a poor appearance.

Figure 2:
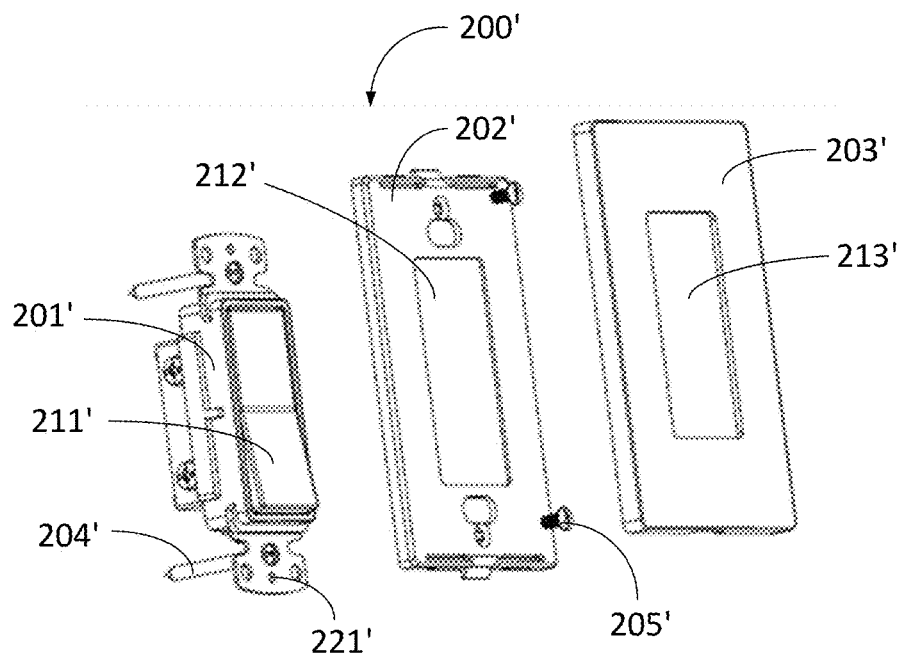
FIG. 2 shows an exploded view of another known electrical device.

FIG. 2 shows an exploded view of another known electrical device 200'. As shown in FIG. 2, another known electrical device 200' comprises a functional module 201', a mounting component 202', and a panel 203'. The functional module 201' is mounted in a mounting box (not shown) via mounting screws 204'. Similarly to the known electrical device 100', the mounting component 202' is mounted onto the functional module 201' by coupling the fixing screws 205' to connecting holes 221' of the functional module 201'. The panel 203' is then snap-fitted to the mounting component 202' to cover the fixing screws 205'. After that, the operating component 211' of the functional module 201' needs to pass through a through hole 212' of the mounting component 202' and a through hole 213' of the panel 203'. Thus, the mounting steps of such an electrical device 200' and the required screws are still relatively cumbersome.

Figure 3:
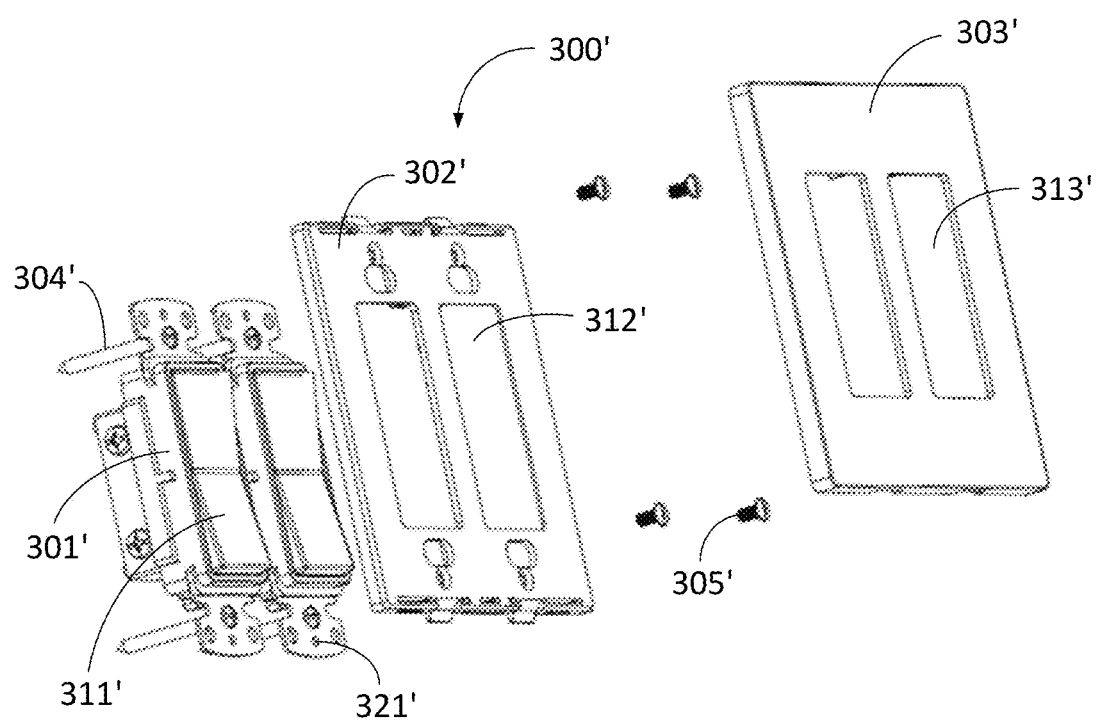
FIG. 3 shows an exploded view of yet another known electrical device.

FIG. 3 shows an exploded view of yet another known electrical device 300'. As shown in FIG. 3, yet another known electrical device 300' comprises a dual functional module 301', a mounting component 302', and a panel 303'. The dual functional module 301' is mounted in a mounting box (not shown) via mounting screws 304'. Similarly, the mounting component 302' is mounted onto the dual functional module 301' by coupling fixing screws 305' to connecting holes 321' of the dual functional module 301'. The panel 303' is then snap-fitted to the mounting component 302' to cover the fixing screws 305'. Two operating component 311' of the dual functional module 301' respectively expose the outside of the panel 303' through the two through holes 312' provided on the mounting component 302' and the two through holes 313' provided on the panel 303'. The installation of such an electrical device 300' still requires two screwing installations to be installed and requires more screws for a total of eight screws. Therefore, the installation steps of such an electrical device 300' and the required screws are even more.

Figure 4:
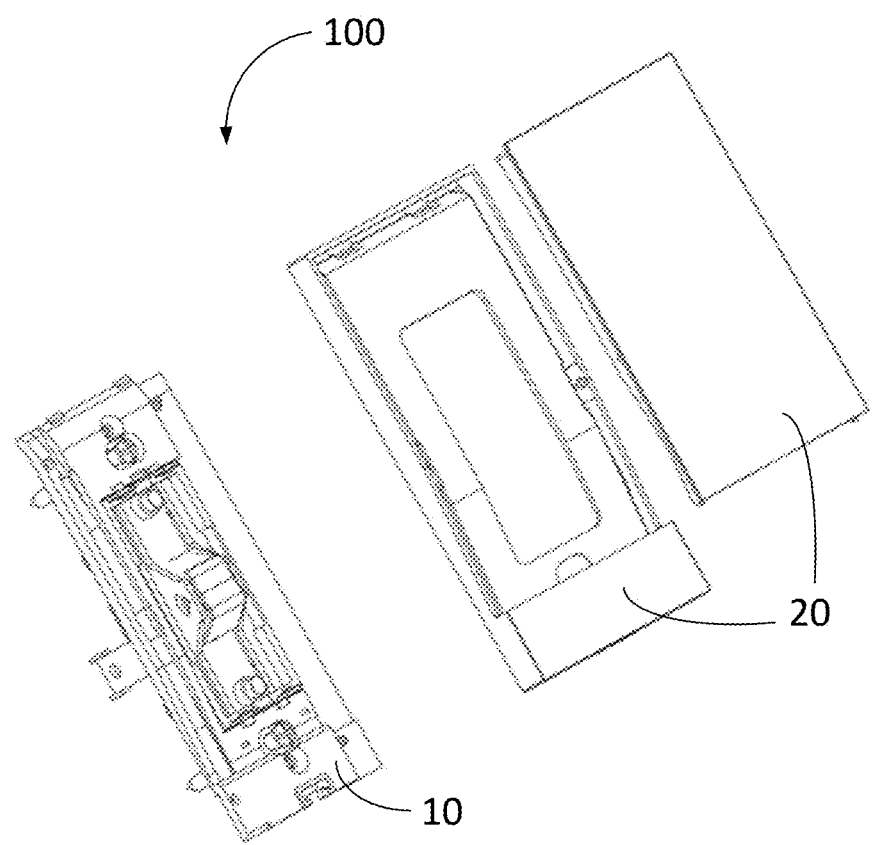
FIG. 4 shows an exploded view of an electrical device according to embodiments of the present disclosure.

Embodiments of the present disclosure provide an electrical device 100. As shown in FIG. 4, the electrical device 100 comprises a functional module 10 and an operational assembly 20. The functional module 10 is adapted to be mounted in a mounting recess (not shown). The operational assembly 20 is coupled with the functional module 10 to operate the functional module 10. In some embodiments, the electrical device 100 may be a switch device or a socket device. However, it should be understood that this is merely exemplary and not intended to limit the scope of the disclosure. Any suitable structures or arrangements are possible. For example, in some alternative embodiments, the electrical device 100 may also be wall sensor, wall cable port, etc.

Figure 5:
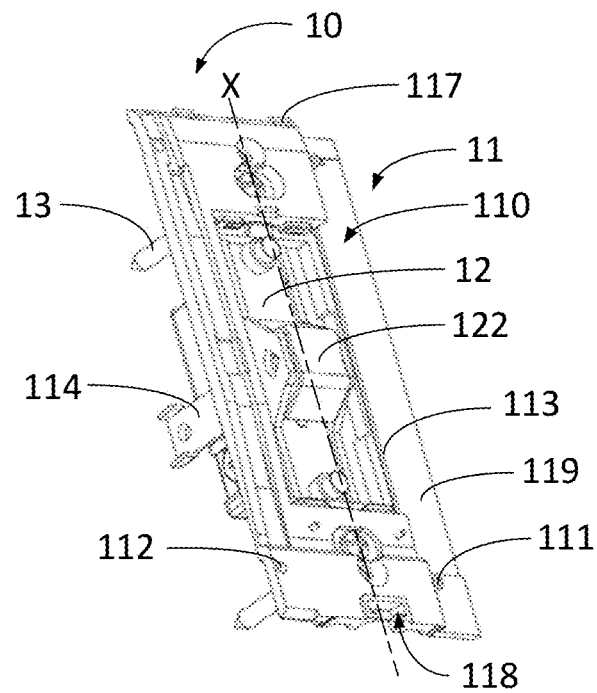
FIG. 5 shows an perspective view of a functional module according to embodiments of the present disclosure.
Figure 6:
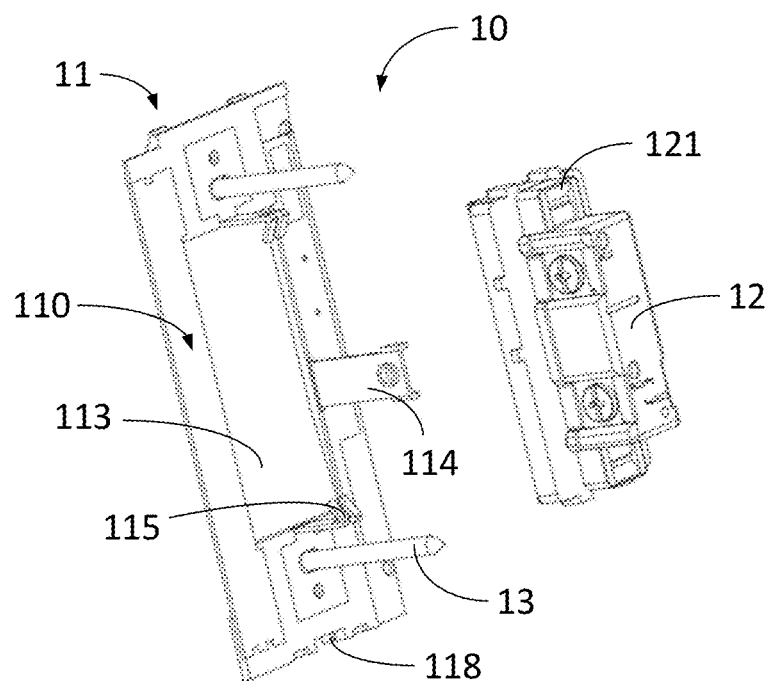
FIG. 6 shows an exploded view of a functional module according to embodiments of the present disclosure.

As shown in FIGS. 5 and 6, the functional module 10 comprises a bracket 11 and a functional component 12. The functional component 12 is coupled with the bracket 11 and supported by the bracket 11.

Figure 7:
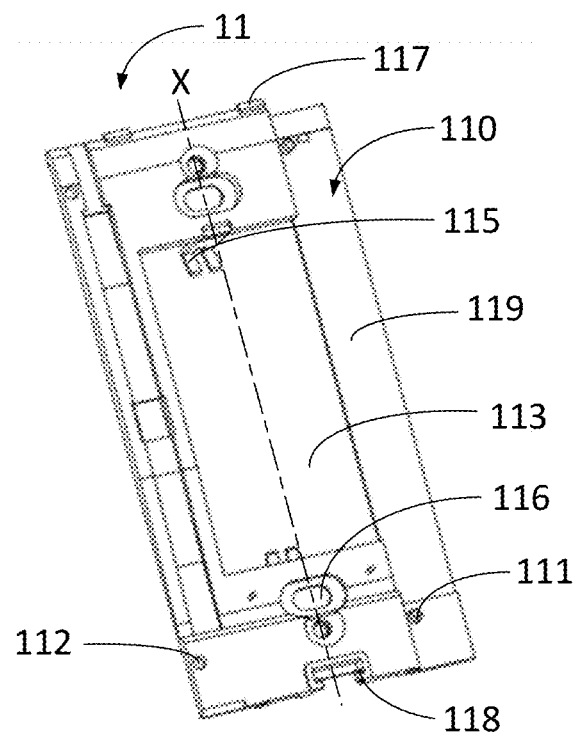
FIG. 7 shows a perspective view of a bracket embodiments of according to the present disclosure.

As shown in FIG. 7, the bracket 11 comprises a body 110, a first coupling portion 111 and a second coupling portion 112. The body 110 comprises a supporting portion 119 adapted to support the functional component 12 of the electrical device 100. The first coupling portion 111 is arranged at a first side of the body 110. The second coupling portion 112 is arranged at a second side of the body 110. The second side is opposite to the first side relative to the body 110. In this way, the first coupling portion 111 and the second coupling portion 112 are symmetrically arranged with respect to a longitudinal axis X of the supporting portion 119. The second coupling portion 112 is adapted to couple with the first coupling portion 111 of a further bracket 11 of the same specification to form a bracket set.

It can be seen that by coupling the first coupling portion 111 to the second coupling portion 112 of the further bracket 11, the plurality of bracket 11 can be coupled to each other to form the bracket set. In this way, the functional component 12 of the electrical device 100 can be formed into a functional set. Therefore, the functional component 12 can be used in a single electronic device 100 or used as a functional portion set, thereby expanding the range of application of the functional component 12.

In some embodiments, as shown in FIG. 7, the first coupling portion 111 may comprise a convex and the second coupling portion 112 may comprise a concave coupled to the convex. With simple structures of the convex and the concave, the manufacturing cost of the bracket 11 can be reduced, and the combination efficiency of the bracket 11 can be improved.

In some embodiments, the convex can be a pin or bump and the concave can be a pin hole or groove. However, it should be understood that this is merely exemplary and not intended to limit the scope of the present disclosure, and that the convex and concave may also be other interfitting structures, for example a hoop and a buckle.

In some embodiments, as shown in FIGS. 5 and 6, the bracket 11 may comprise a grounding member 114. The grounding member 114 is electrically coupled to the functional component 12 to provide grounding for the functional component 12. Therefore, the grounding member 114 of the functional module 10 and the bracket 11 are manufactured together, thereby reducing the number of components of the functional module 10. As a result, the assembly of the functional module 10 simplified and the assembling efficiency of the functional module 10 is improved.

In some embodiments, the grounding member 114 may be integrally formed with the body 110. Typically, the grounding member 114 is made of metal, so that the bracket 11 can be enabled to have a metallic feel. Therefore, the appearance of the functional module 10 can be improved.

In some embodiments, as shown in FIG. 6, the bracket 11 may comprise a buckle 115. The functional component 12 may comprise a buckle groove 121 that is adapted to couple with the buckle 115. Thereby, the functional component 12 can be quickly attached to the bracket 11, and the installing efficiency of the functional module 10 can be improved. However, it should be understood that the connection of the bracket 11 and the functional component 12 is not limited to the buckle 115 and the buckle groove 121. Other connection ways may be provided, such as riveting and the like, as long as the functional component 12 can be fixed to the bracket 11 reliably.

In some embodiments, as shown in FIG. 4, the operational assembly 20 may be detachably snap-coupled with the functional module 10. In this way, screwing steps can be avoided, and snapping can facilitate installation between the operational assembly 20 and the functional module 10. Thereby the mounting efficiency of the electrical device 100 is improved.

In some embodiments, as shown in FIG. 6, the functional module 10 may comprise a snap slot 118. The operational assembly 20 may comprise an operable button 214 that is coupled to the snap slot 118. The operable button 214 is adapted to be pressed to decouple the operational assembly 20 from the functional module 10. In this way, the disassembly and assembly between the operational assembly 20 and the functional module 10 can be more convenient. As a result, the installing and maintaining efficiency of the electrical device 100 can be improved. However, it should be understood that this is merely exemplary, the location of the snap slot 118 and the operable button 214 may be interchanged. In addition, the decoupling structure between the functional module 10 and the operational assembly 20 may be other structures, such as swing tripping structure, etc.

Figure 8:
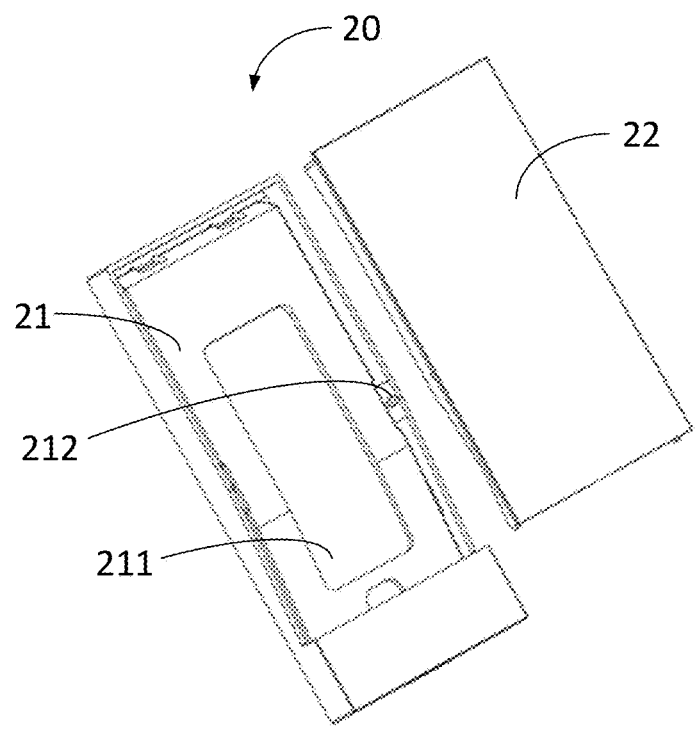
FIG. 8 shows an exploded view of an operational assembly according to embodiments of the present disclosure.

In some embodiments, as shown in FIG. 8, the operational assembly 20 may comprise a mounting component 21 and an operating component 22. As shown in FIGS. 4 and 8, the mounting component 21 may be arranged to and coupled with the functional module 10. The operating component 22 may be arranged on and rotatably coupled with the mounting component 21, such that the operating component 22 is capable of operating the functional module 10. In this way, the operational assembly 20 may be coupled to the functional module 10 as a whole. As a result, a structure of the electrical device 100 is more modular, and the flexibility of the installation of the electric device 100 is improved.

Figure 9:
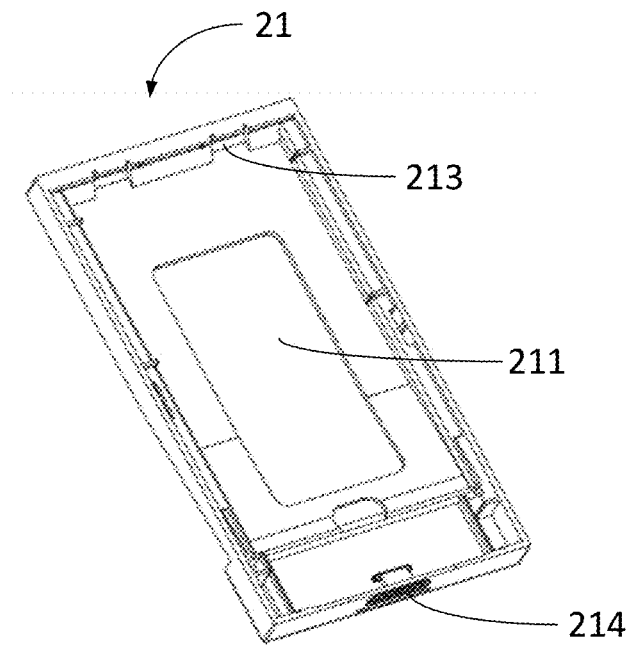
FIG. 9 shows a perspective view of a mounting component according to embodiments of the present disclosure.

In some embodiments, as shown in FIGS. 7 and 9, the bracket 11 may comprise a fixture block 117. The mounting component 21 may comprise a notch 213. A snap fit between the operational assembly 20 and the functional module 10 can be achieved by a match between the fixture block 117 and the notch 213. However, it should be understood that this is merely exemplary, the location of the fixture block 117 and the notch 213 may be interchanged.

In some embodiments, the mounting component 21 may be arranged on the bracket 11 of the functional module 10 and coupled to the bracket 11. In this way, the number of components of the electrical device 100 can be reduced, and the mounting procedure of the electric device 100 can be reduced.

In some embodiments, as shown in FIG. 8, the mounting component 21 may comprise a mounting frame. Operating component 22 may comprise an operable panel. The operable panel is visually more aesthetically pleasing and easy to be operated. As a result, an appearance and an operability of the electric device 100 are improved.

Figure 10:
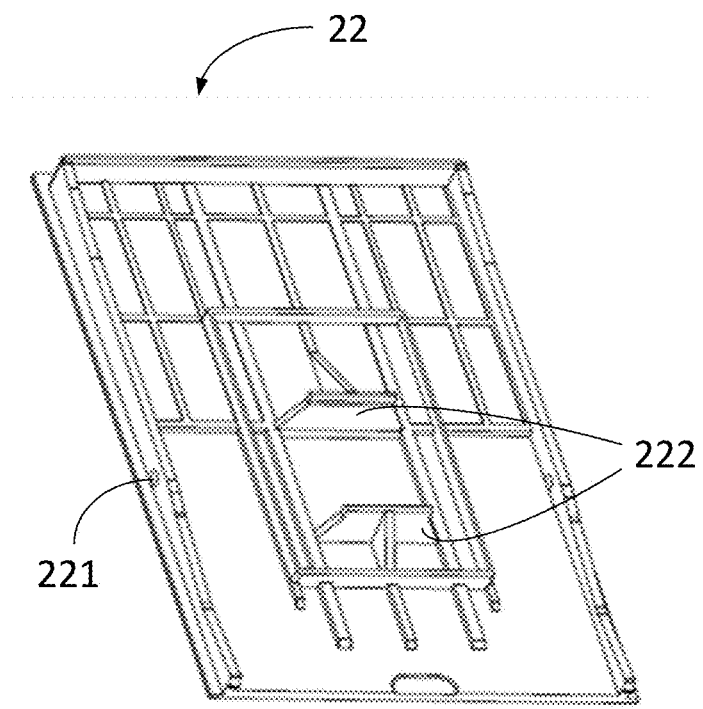
FIG. 10 shows a perspective view of an operating component according to embodiments of the present disclosure.

In some embodiments, as shown in FIG. 8, the mounting component 21 may comprise a rotating shaft 212. As shown in FIG. 10, the operating component 22 may comprise a shaft hole 221 that is coupled to the rotating shaft 212. In this way, the rotating shaft 212 and the shaft hole 221 have a simple structure. As a result, a structure of the electrical device 100 is simplified. However, it should be understood that this is merely exemplary, and the positions at which the rotating shaft 212 and the rotating shaft hole 221 are disposed may be interchanged.

In some embodiments, as shown in FIG. 5, the functional module 10 may comprise a switching component 122 for switching the state of the electrical device 100. The bracket 11 may comprise an opening 113. The switching component 122 may be exposed from the opening 113. The operating component 22 may comprise a driving portion 222. The driving portion 222 is coupled to the switching component 122 to switch the state of the electrical device 100. In this way, the operating component 22 and the switching component 122 can be arranged separately, so that the shape of the operating component 22 can be easily designed.

In some embodiments, as shown in FIG. 5, the switching component 122 may comprise a swing lever for switching the state of the electrical device 100 by rotation. As shown in FIG. 10, the driving portion 222 may comprise a pressing block for pressing the surface of the swing lever. The swing lever is driven by the operating component 22 to rotate. In this way, the operation of the swing lever is more flexible, and the switching of the state is more reliable. Therefore, the structure of the electrical device 100 can be simplified, and the switching of the state of the electrical device 100 can be more reliable. However, it should be understood that the form of the driving portion 222 is not limited to pressing block, and may be other forms, such as a pressing post or the like.

Figure 11:
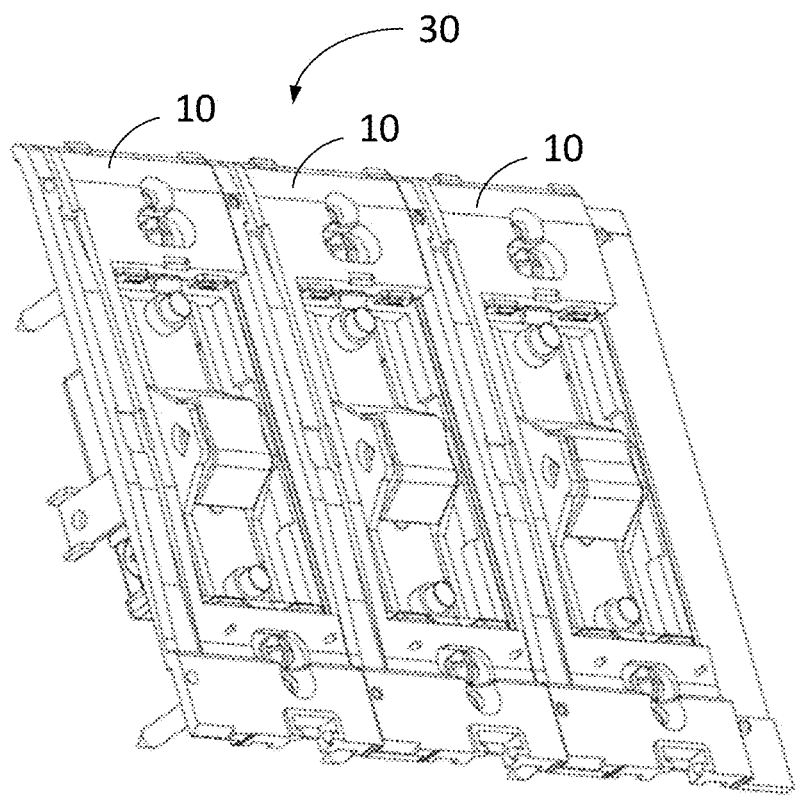
FIG. 11 shows a perspective vies a combination of functional modules according to embodiments of the present disclosure.
Figure 12:
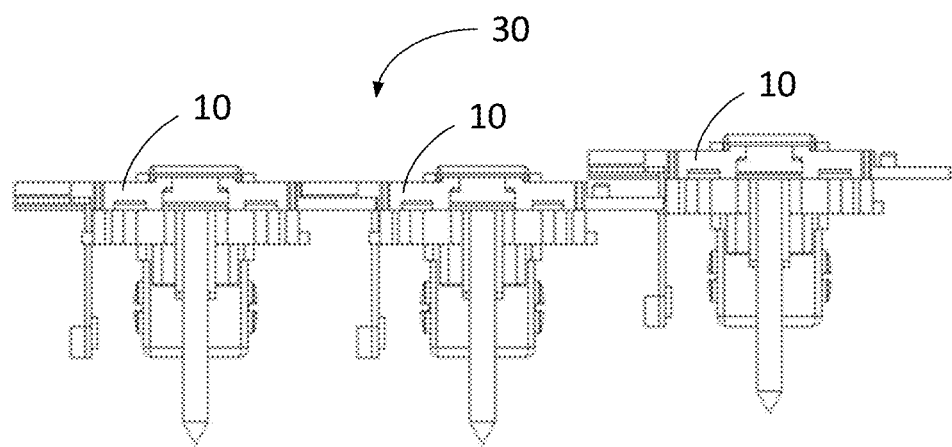
FIG. 12 shows another side view a combination of functional modules according to embodiments of the present disclosure.

In some embodiments, as shown in FIGS. 11 and 12, the electrical device 100 may comprise a plurality of functional modules 10. The plurality of functional modules 10 form a functional module set 30 by means of coupling adjacent brackets 11. In this way, the individual functional modules 10 can be combined with each other to form a multi-module. As a result, the versatility of the functional module 10 is improved, the combination of the functional modules 10 is more flexible, and more screws are saved. In this case, the cost of design and installation of the electrical device 100 can be reduced. Although the set 30 consisting of three functional modules 10 is shown in FIGS. 11 and 12, it should be understood that the number of functional modules 10 is not limited to three, and may be any number as needed, for example, two or four, and so on.

Figure 13A:
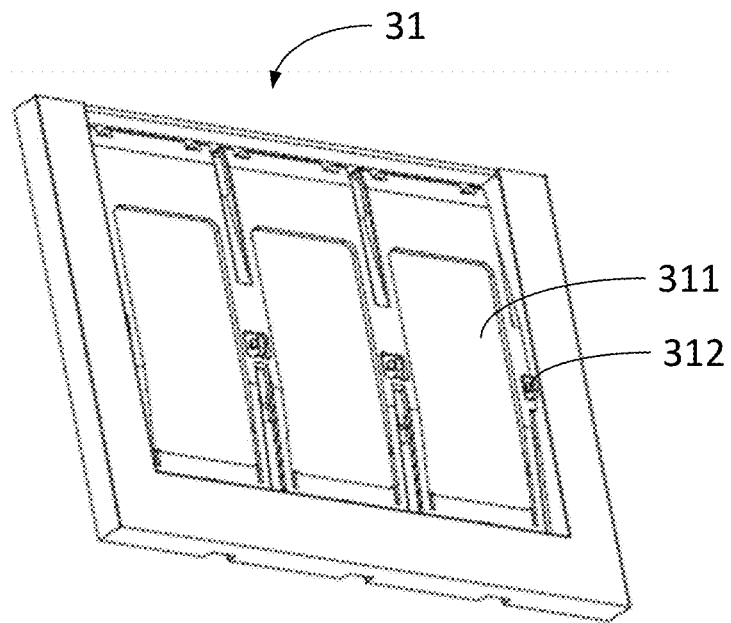
FIG. 13A shows a perspective view of a multi-mounting component for a combination of functional modules according to embodiments of the present disclosure.
Figure 13B:
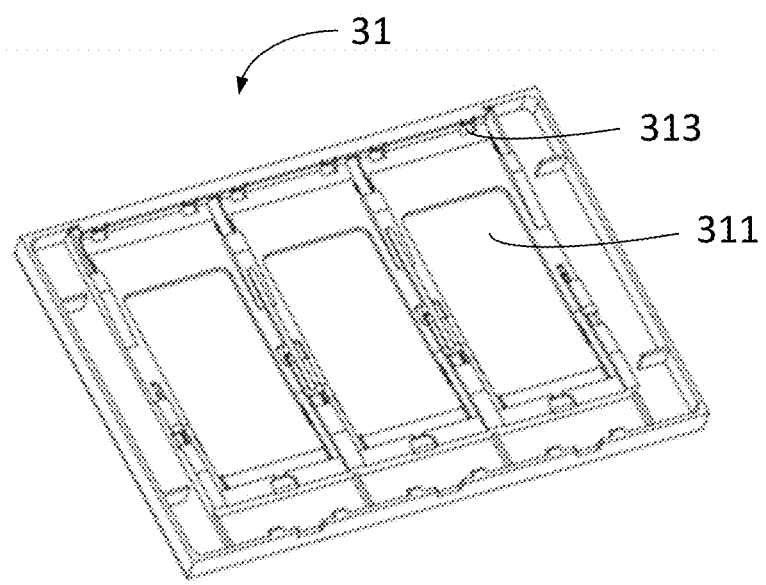
FIG. 13B shows another perspective view of a multi-mounting component for a combination of functional modules according to embodiments of the present disclosure.
Figure 14:
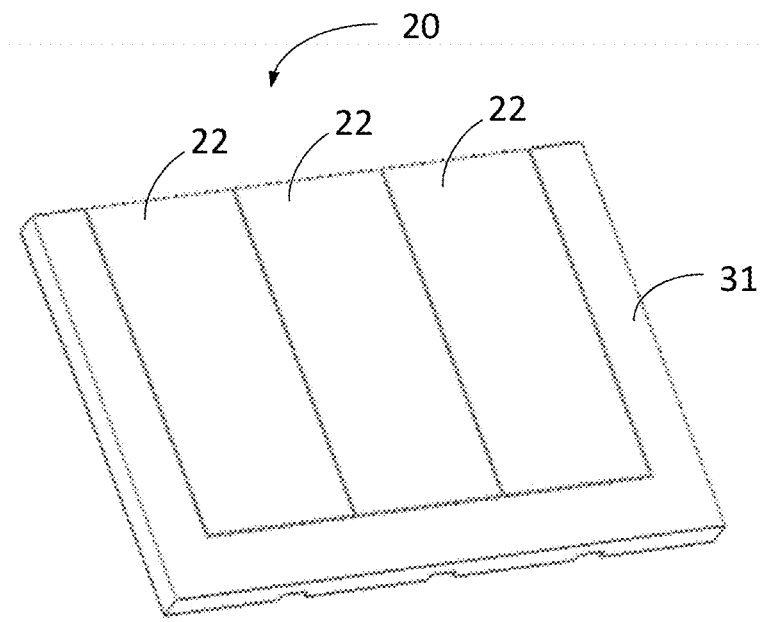
FIG. 14 shows a perspective view of an operational assembly for a combination of functional modules according to embodiments of the present disclosure.

In some embodiments, as shown in FIGS. 13A and 13B, the operational assembly 20 may comprise a multi-mounting component 31 and a plurality of operating components 22. The multi-mounting component 31 is arranged on the functional module 30 and coupled to the functional module 30. As shown in FIG. 14, a plurality of operating component 22 are arranged on and rotatably coupled with the multi-mounting members 31. As a result, each of the operating components 22 is capable of operating one of the functional modules 10 of the set 30, respectively. A rotatable structure of the operating component 22 and the multi-mounting member 31 can refer to that of the operating component 22 and the mounting component 21 as shown in FIGS. 8 and 10. In this way, a plurality of functional modules 10 can be conveniently controlled simultaneously.

Figure 15:
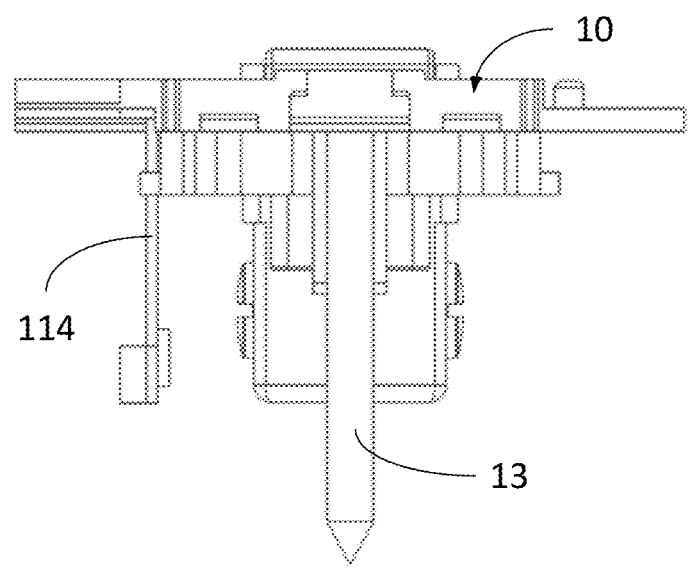
FIG. 15 shows a side view of a mounted functional module according to embodiments of the present disclosure.
Figure 16:
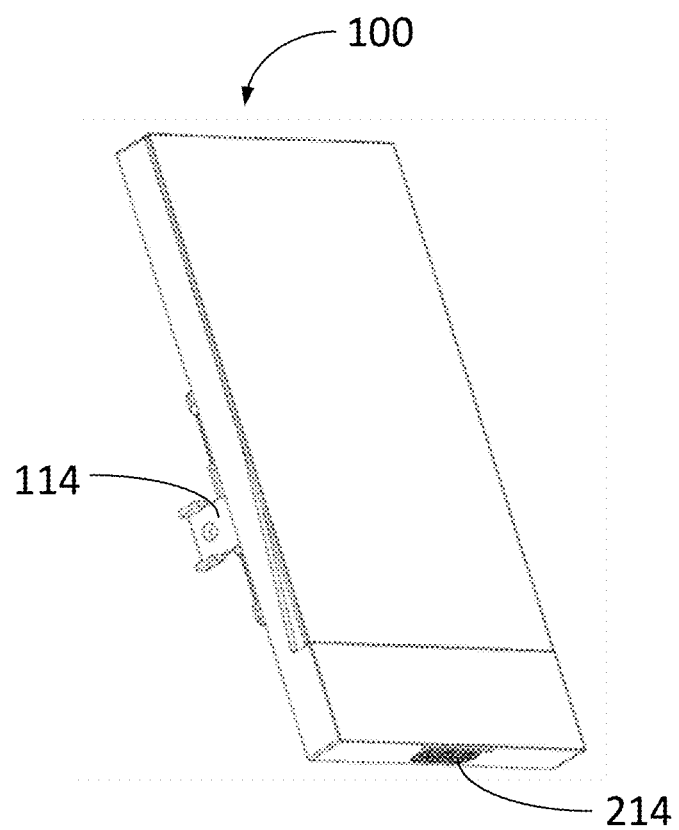
FIG. 16 shows a perspective view of the mounted electrical device according to embodiments of the present disclosure after installation.

An embodiment of the present disclosure provides a method for mounting the electrical device 100. As shown in FIGS. 15 and 16, the method comprises: mounting the functional module 10 into the mounting recess; combining the mounting component 21 and the operating component 22 to constitute the operational assembly 20; and snapping the operating assembly 20 onto the functional module 10.

When mounting a functional module 10, a screw passes through a through hole 116 of a bracket 11 and then is screwed into a thread hole of a wall box (not shown). Then an operating component 22 is installed to a mounting component 21 to constitute an operational assembly 20. Finally, the operational assembly 20 is coupled to the functional module 10 to complete the installation of an electrical device 100.

It can be seen that the connection between the operational assembly 20 and the functional module 10 does not need to be fixed by screws. In this way, installing steps of the electrical device 100 can be saved and installing efficiency of the electrical device 100 can be improved.

In some embodiments, the method for mounting the electrical device 100 may comprise coupling the functional module 10 with further functional modules 10 to form a functional module set 30 before the functional module 10 is mounted into the mounting recess. In this way, the plurality of functional modules 10 can be mounted at the same time more quickly, thereby the mounting efficiency of the electric device 100 can be further improved.

It should be understood that all the numbers of the present disclosure are exemplary and may be adjusted according to specific requirements.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A functional module for an electrical device, comprising:
   a bracket, comprising:
      a body comprising a supporting portion adapted to support a functional component of the electrical device; and
      a first coupling portion and a second coupling portion symmetrically arranged on the body with respect to a longitudinal central axis of the supporting portion,
      wherein the second coupling portion is adapted to be coupled with the first coupling portion of a further bracket of the same specification to form a bracket set; and
   a functional component coupled to and supported by the bracket,
   wherein the bracket comprises a grounding member electrically connected to the functional component to provide grounding for the functional component.

2. The functional module according to claim 1, wherein one of the first coupling portion and the second coupling portion comprises a convex and the other comprises a concave coupled to the convex.

3. The functional module according to claim 1, wherein the grounding member is integrally formed with the body of the bracket.

4. The functional module according to claim 1, wherein the bracket comprises a buckle, and the functional component comprises a buckle groove coupled with the buckle.

5. An electrical device, comprising:
   a functional module according to claim 1, adapted to be mounted in a mounting recess; and an operational assembly coupled to the functional module for the operation of the functional module.

6. The electrical device according to claim 5, wherein the operational assembly is detachably snap-coupled with the functional module.

7. The electrical device according to claim 5, wherein the functional module comprises a snap slot, and the operational assembly comprises an operable button coupled with the snap slot, which operable button is adapted to be pressed to decouple the operational assembly from the functional module.

8. The electrical device according to claim 5, wherein the operational assembly comprises:
   a mounting component arranged on and coupled to the functional module; and
   an operating component arranged on and rotatably coupled to the mounting component such that the operating component is capable of operating the functional module.

9. The electrical device according to claim 8, wherein the mounting component is arranged on and coupled with the bracket of the functional module.

10. The electrical device according to claim 8, wherein the mounting component comprises a mounting frame and the operating component comprises an operable panel.

11. The electrical device according to claim 8, wherein one of the mounting component and the operating component comprises a rotating shaft, and the other of the mounting component and the operating component comprises a shaft hole coupled with the rotating shaft.

12. The electrical device according to claim 8, wherein the functional module comprises a switching component for switching the state of the electrical device, and the operating component comprises a driving portion coupled with the switching component for driving the switching component to switch the state of the electrical device.

13. The electrical device according to claim 12, wherein the switching component comprises a swing lever for switching the state of the electrical device by rotation; and
   the driving portion comprises a pressing block for pressing a surface of the swing lever by the rotation of the operating component to drive the swing lever to rotate.

14. The electrical device according to claim 5, comprising a plurality of the functional modules which form a functional module set by means of the coupling adjacent brackets.

15. The electrical device according to claim 14, wherein the operational assembly comprises:
   a multi-mounting component arranged on and coupled to the functional module set; and
   a plurality of operating components arranged on and rotatably coupled to the multi-mounting component such that each of the operating components is capable of operating one of the functional modules of the functional module set respectively.

16. The electrical device according to claim 5, wherein the electrical device is a switch device or a socket device.

17. A method for mounting an electrical device, wherein the electrical device comprises a functional module, a mounting component and an operating component, the functional module comprising a bracket comprising:
   a body comprising a supporting portion adapted to support a functional component of the electrical device;
   a first coupling portion and a second coupling portion symmetrically arranged on the body with respect to a longitudinal central axis of the supporting portion; and
   a grounding member electrically connected to the functional component to provide grounding for the functional component,
   and the method comprising:
   mounting the functional module into a mounting recess;
   combining the mounting component and the operating component to constitute an operational assembly; and
   snapping the operational assembly onto the functional module,
   wherein the functional module is coupled with further functional modules of the same specification to form a functional module set by coupling the second coupling portion to a first coupling portion of a bracket of one of the further functional modules before the functional module is mounted into the mounting recess.

* * * * *